United States Patent
Zhou

(10) Patent No.: US 11,005,784 B2
(45) Date of Patent: May 11, 2021

(54) ETHERNET SWITCH AND REMOTE TRANSMISSION METHOD THEREOF

(71) Applicant: Hangzhou Hikvision Digital Technology Co., Ltd., Zhejiang (CN)

(72) Inventor: Xin Zhou, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/461,991

(22) PCT Filed: Aug. 17, 2017

(86) PCT No.: PCT/CN2017/097823
§ 371 (c)(1),
(2) Date: May 17, 2019

(87) PCT Pub. No.: WO2018/099140
PCT Pub. Date: Jun. 7, 2018

(65) Prior Publication Data
US 2019/0319897 A1    Oct. 17, 2019

(30) Foreign Application Priority Data

Nov. 30, 2016 (CN) .......................... 201611085443.0

(51) Int. Cl.
*H04L 12/931* (2013.01)
*H04L 12/935* (2013.01)
(Continued)

(52) U.S. Cl.
CPC .......... *H04L 49/351* (2013.01); *H04L 5/1446* (2013.01); *H04L 45/22* (2013.01);
(Continued)

(58) Field of Classification Search
CPC . H04L 49/351; H04L 49/3054; G06F 11/2033
(Continued)

(56) References Cited

U.S. PATENT DOCUMENTS

| 6,098,110 A * | 8/2000 | Witkowski ............ H04L 49/351 370/412 |
| 2004/0015923 A1 * | 1/2004 | Hemsing ............. G06F 9/44557 717/154 |

(Continued)

FOREIGN PATENT DOCUMENTS

| CN | 1334663 A | 2/2002 |
| CN | 1174581 C | 11/2004 |

(Continued)

*Primary Examiner* — Asad M Nawaz
*Assistant Examiner* — Jason A Harley
(74) *Attorney, Agent, or Firm* — Bret E. Field; Bozicevic, Field & Francis LLP

(57) ABSTRACT

The present application discloses a long-distance transmission method for an Ethernet switch including a network switching module, an MCU module and a dial code module. The MCU module is connected to the network switching module and the dial code module. The dial code module is configured for providing two configuration inputs for a normal mode and a long-distance mode for user equipment. The MCU module is configured for monitoring a configuration input state of the dial code module in real time. When detecting that the dial code module is in the configuration input for the normal mode, the MCU module configures a network port of the network switching module to be in a self-negotiation mode. When detecting that the dial code module is in the configuration input state for the long-distance mode, the MCU module configures the network port of the network switching module to be in a 10 Mbps full-duplex mode and controls an amplitude of an output voltage of a network signal of the network switching module to increase. The network switching module is configured for negotiating a network link bandwidth of 10 Mbps and a full duplex mode between the network switching module and the user equipment for long-distance data transmission according to a configuration made by the MCU module when the (Continued)

dial code module is in the long-distance mode. The embodiments of the present application are applied to long-distance data transmission.

10 Claims, 1 Drawing Sheet

(51) Int. Cl.
    *H04W 52/04*     (2009.01)
    *H04M 7/00*     (2006.01)
    *H04L 12/937*     (2013.01)
    *H04L 5/14*     (2006.01)
    *H04L 12/707*     (2013.01)
    *H04L 12/703*     (2013.01)
    *H04L 12/933*     (2013.01)

(52) U.S. Cl.
    CPC ............ *H04L 45/28* (2013.01); *H04L 49/102* (2013.01); *H04L 49/3054* (2013.01)

(58) Field of Classification Search
    USPC .............................................. 370/386, 395.53
    See application file for complete search history.

(56) References Cited

U.S. PATENT DOCUMENTS

| | | | |
|---|---|---|---|
| 2005/0135413 A1* | 6/2005 | Yang | H04L 25/4917 370/463 |
| 2005/0259589 A1* | 11/2005 | Rozmovits | H04L 1/243 370/249 |
| 2006/0143181 A1* | 6/2006 | Liu | H04L 41/12 |
| 2007/0263656 A1* | 11/2007 | Niu | H04J 3/1694 370/465 |
| 2008/0288677 A1* | 11/2008 | Kirshtein | G06F 3/023 710/67 |
| 2009/0196287 A1* | 8/2009 | Yu | H04L 12/40032 370/389 |
| 2011/0188519 A1* | 8/2011 | Yu | H04L 5/1446 370/477 |
| 2016/0275901 A1* | 9/2016 | Guo | H04N 5/63 |
| 2018/0089057 A1* | 3/2018 | Yang | G06F 11/3495 |
| 2018/0212598 A1* | 7/2018 | Chen | H03K 5/19 |

FOREIGN PATENT DOCUMENTS

| | | |
|---|---|---|
| CN | 2932839 Y | 8/2007 |
| CN | 203120093 U | 8/2013 |
| CN | 104954208 A | 9/2015 |
| WO | WO2005057839 A1 | 6/2005 |

* cited by examiner

ETHERNET SWITCH AND REMOTE TRANSMISSION METHOD THEREOF

The present application claims the priority to a Chinese patent application No. 201611085443.0 filed with the China National Intellectual Property Administration on Nov. 30, 2016 and entitled "Ethernet switch and remote transmission method thereof", which is incorporated herein by reference in its entirety.

TECHNICAL FIELD

The present application relates to the field of computer network technology, and in particular to an Ethernet switch and its long-distance transmission method.

BACKGROUND

With the rapid development of computer and network technologies, Ethernet has become the most popular computer networking technology used in short-distance transmission on Layer 2. The core component of Ethernet is Ethernet switch.

An Ethernet switch is a switch that transmits data based on Ethernet. A local area network using Ethernet may have a bus type topology with a shared transmission medium. The Ethernet switch is structured to have ports each of which is connected to a host and generally works in a full duplex mode. A switch can make multiple pairs of ports to be connected at the same time, so that each pair of hosts communicating with each other can transmit data without conflicts, as if they monopolize the communication medium.

Currently, in application of network equipment, a user may encounter a problem that the network may not be accessible or data loss when the wiring distance between the equipment and the switch is more than 100 m or a non-standard cable with poor quality is used. Existing solutions usually use a dedicated long-distance network switching chip.

The use of a dedicated long-distance network switching chip requires changes in existing network wiring and front-end network equipment, which increases the cost.

SUMMARY

In view of this, an embodiment of the present application provides an Ethernet switch and a long-distance transmission method for the Ethernet switch, to solve the problem that the network cannot be accessed or that there is a data loss when the wiring distance between equipment and the switch is more than 100 m or a non-standard cable with poor quality is used.

In a first aspect, an embodiment of the present application provides an Ethernet switch, including a network switching module, a microcontroller unit (MCU) module and a dial code module; the MCU module is connected to the network switching module, and the dial code module is connected to the MCU module.

The dial code module is configured for providing two configuration inputs for a normal mode and a long-distance mode for user equipment.

The MCU module is configured for monitoring a configuration input state of the dial code module in real time. When detecting that the dial code module is in the configuration input for the normal mode, the MCU module configures a network port of the network switching module to be in a self-negotiation mode. When detecting that the dial code module is in the configuration input state for the long-distance mode, the MCU module configures the network port of the network switching module to be in a 10 Mbps full-duplex mode and controls an amplitude of an output voltage of a network signal of the network switching module to increase.

The network switching module is configured for negotiating a network link bandwidth of 10 Mbps and a full duplex mode between the network switching module and the user equipment for long-distance data transmission according to a configuration made by the MCU module when the dial code module is in the long-distance mode.

With reference to the first aspect, in first implementation of the first aspect, the network switching module includes a network port speed control register. The MCU module is configured for setting the network port speed control register of the network switching module to the 10 Mbps full duplex mode when detecting that the dial code module is in the configuration input state for the long-distance mode.

With reference to the first implementation of the first aspect, in second implementation of the first aspect, the network switching module includes a network port physical output signal control register. The MCU module is configured for, detecting that the dial code module is in the configuration input state for the long-distance mode, configuring the network port physical output signal control register of the network switching module to adjust slopes of a rising edge and a falling edge of a waveform of a physical output signal of the network port of the network switching module to a preset threshold and increase an amplitude of the waveform of the physical output signal to a preset voltage value.

With reference to the second implementation of the first aspect, in third implementation of the first aspect, the Ethernet switch further includes a power module, a display module, a clock module, a reset module, a transformer module, and a network interface module. The power module, the display module, the clock module, the reset module and the transformer module are connected to the network switching module respectively, and the network interface module is connected to the transformer module.

The power module is configured for supplying power to the network switching module, which converts external input power into internal operating power.

The display module is configured for providing an indication for an operating status of the network switching module.

The clock module is configured for providing a system operating clock for the network switching module.

The reset module is configured for providing a system reset signal for the network switching module.

The transformer module is configured for providing an Ethernet physical-link layer signal isolation function for the network switching module.

The network interface module is configured for providing an n interface for a network device to access the network switching module.

With reference to the third implementation of the first aspect, in fourth implementation of the first aspect, the display module is an LED display panel, and the network interface module is an RJ45 interface.

In the second aspect, an embodiment of the present application provides a long-distance transmission method for an Ethernet switch including a network switching module, an MCU module, and a dial code module. The method includes:

after the Ethernet switch is powered on, monitoring, by the MCU module, the configuration input state of the dial code module in real time;

when the dial code module is detected being in the configuration input state for a normal mode, configuring, by the MCU module, a network port of the network switching module to be in a self-negotiation mode; and when the dial code module is detected being in the configuration input state for a long-distance mode, configuring, by the MCU module, the network port of the network switching module to be in a 10 Mbps full duplex mode and controlling an amplitude of an output voltage of the network signal of the network switching module to increase; and negotiating, by the network switching module, a network link bandwidth of 10 Mbps and a full duplex mode between the network switching module and the user equipment for long-distance data transmission according to the configuration made by the MCU module.

With reference to the second aspect, in first implementation of the second aspect, the network switching module includes a network port speed control register. Configuring, by the MCU module, the network port of the network switching module to be in a 10 Mbps full duplex mode including: setting, by the MCU module, the network port speed control register of the network switching module to the 10 Mbps full duplex mode.

With reference to the first implementation of the second aspect, in second implementation of the second aspect, the network switching module includes a network port physical output signal control register. Controlling, by the MCU module, an amplitude of an output voltage of a network signal including: configuring, by the MCU module, the network port physical output signal control register of the network switching module to adjust slopes of a rising edge and a falling edge of a waveform of the a physical output signal of the network port of the network switching module to a preset threshold and increase an amplitude of a waveform of the physical output signal to a preset voltage value.

With reference to the second implementation of the second aspect, in third implementation of the second aspect, the Ethernet switch further includes a power module, a display module, a clock module, a reset module, a transformer module, and a network interface module. The method further includes:

supplying, by the power module, power to the network switching module, which converts external input power into internal operating power;

providing, by the display module, an indication of an operating status of the network switching module;

providing, by the clock module, a system operating clock for the network switching module;

providing, by the reset module, a system reset signal for the network switching module; providing, by the transformer module, an Ethernet physical-link layer signal isolation function for the network switching module; and providing, by the network interface module, an interface for a network device to access the network switching module.

With reference to the third implementation of the second aspect, in fourth implementation of the second aspect, the display module is an LED display panel, and the network interface module is an RJ45 interface.

The present application provides a Ethernet switch and a long-distance transmission method for the Ethernet switch. When the MCU module detects that the dial code module is the configuration input state for the long-distance mode, the MCU module configures the network port of the network switching module to be in the 10 Mbps full duplex mode and controls the amplitude of the output voltage of the network signal of the network switching module to increase. The network switching module negotiates the network link bandwidth of 10 Mbps and full duplex mode between the network switching module and the user equipment for long-distance data transmission according to the configuration by the MCU module. Compared to the prior art, the embodiment of the present application achieves a long-distance data transmission over Ethernet by using a 10 Mbps network and increasing the amplitude of the output voltage of the network signal, and the transmission distance of data over Ethernet can be extended without a dedicated long-distance network chip. A user can extend the distance for network accesses without making any change in the existing network wiring and front-end network devices, which protects the original investment of the user. In the construction of networks, such a switch may be added or may replace an old conventional Ethernet switch, so as to achieve an economical solution for the problem that the network may be inaccessible or there may be a data loss due to the wiring distance between a device and the switch over 100 m or a non-standard cable with poor quality.

BRIEF DESCRIPTION OF THE DRAWINGS

In order to explain the technical solutions of embodiments of the present application or of the prior art, the drawings required in explaining the embodiments and the prior art will be briefly described. Apparently, the drawings described below merely illustrate some embodiments of the present application, and a person of ordinary skills in the art may derive other drawings from the drawings described herein without creative efforts.

DETAILED DESCRIPTION

The embodiments of the application will be described in detail with reference to the drawings.

It should be understood that the embodiments described are only some embodiments of the present application instead of all embodiments. All further embodiments obtained by those of ordinary skills in the art based on the embodiments herein without any creative efforts are within the scope of the present application.

Figure 1:
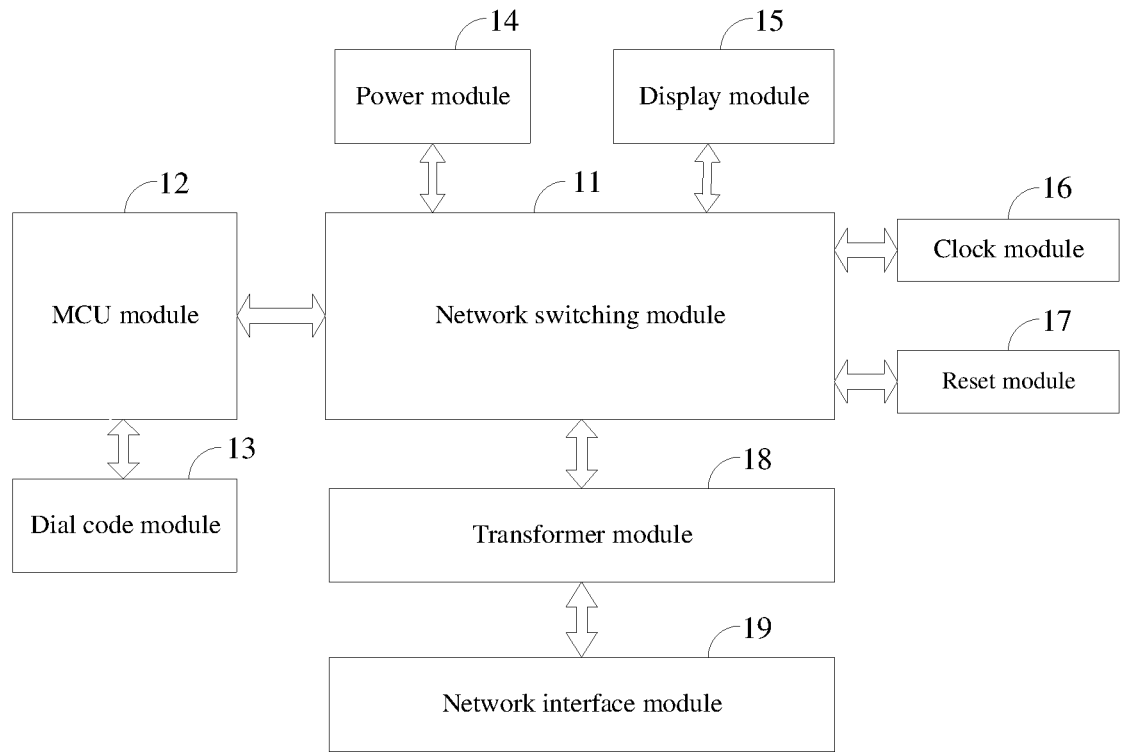
FIG. 1 is a schematic diagram depicting the structure of an Ethernet switch according to an embodiment of the present application.

An embodiment of the present application provides an Ethernet switch. As shown in FIG. 1, the Ethernet switch includes a network switching module 11, an MCU (Microcontroller Unit) module 12, and a dial code module 13. The MCU module 12 is connected to the network switching module 11, and the dial code module 13 is connected to the MCU module 12.

The dial code module 13 is configured for providing two configuration inputs for a normal mode and a long-distance mode for user equipment.

The MCU module 12 in the Ethernet switch provides a logic control function, including a dial code input detection function and a long-distance mode configuration function. The MCU module 12 is configured for monitoring the state of the dial code module 13 in real time. When the MCU module detects that the dial code module 13 is in the configuration input state for the normal mode, it configures a network port of the network switching module 11 to be in a self-negotiation mode. When the MCU module detects that the dial code module 13 is in the configuration input state for the long-distance mode, it configures the network port of the network switching module 11 to be in a 10 Mbps full-duplex mode and controls the amplitude of the output voltage of a network signal of the network switching module 11 to increase.

The network switching module 11 is a core component of the Ethernet switch, which is mainly composed of a network switching chip, provides an Ethernet network data switching function, and is responsible for accessing network devices from a long distance and uploading data. The network switching module 11 is configured for negotiating a network link bandwidth of 10 Mbps and a full duplex mode between the network switching module and the user equipment for long-distance data transmission according to the configuration made by the MCU module 12 when the dial code module 13 is in the long-distance mode.

Specifically, in controlling the amplitude of the output voltage of the network signal of the network switching module 11 to increase, a maximum value for the voltage amplitude may be determined according to parameters of the network switching chip in the network switching module, and the amplitude of the output voltage may be increased based on the determined maximum value. For example, the amplitude of the output voltage is adjusted to the maximum value.

It should be noted that, the full duplex mode refers to an operation mode that allows simultaneous data communication in both directions, namely simultaneously transmitting data and receiving data.

In an embodiment of the Ethernet switch provided herein, when the MCU module detects that the dial code module is the configuration input state for the long-distance mode, the MCU module configures the network port of the network switching module to be in the 10 Mbps full duplex mode and controls the amplitude of the output voltage of the network signal of the network switching module to increase. The network switching module negotiates the network link bandwidth of 10 Mbps and full duplex mode between the network switching module and the user equipment for long-distance data transmission according to the configuration by the MCU module. Compared to the prior art, the embodiment of the present application achieves a long-distance data transmission over Ethernet by using a 10 Mbps network and increasing the amplitude of the output voltage of the network signal, and the transmission distance of data over Ethernet can be extended without a dedicated long-distance network chip. A user can extend the distance for network accesses without making any change in the existing network wiring and front-end network devices, which protects the original investment of the user. In the construction of networks, such a switch may be added or may replace an old conventional Ethernet switch, so as to achieve an economical solution for the problem that the network may be inaccessible or there may be a data loss due to the wiring distance between a device and the switch over 100 m or a non-standard cable with poor quality.

Specifically, the network switching module 11 includes a network port speed control register (not shown in the figure). The MCU module 12 is configured for, when detecting that the dial code module 13 is in the configuration input state for the long-distance mode, setting the network port speed control register of the network switching module to the 10 Mbps full duplex mode.

Specifically, the network switching module 11 includes a network port physical output signal control register (not shown in the figure). The MCU module 12 is configured for, when detecting that the dial code module 13 is in the configuration input state for the long-distance mode, configuring the network port physical output signal control register of the network switching module, to adjust slopes of both the rising edge and the falling edge of a waveform of the physical output signal of the network port of the network switching module to a preset threshold and increase the amplitude of the waveform of the physical output signal to a preset voltage value, for example, increasing from 1.8 V to 2.2 V. Existing methods may be used to adjust the slopes of the rising edge and falling edge of the waveform of the physical output signal and to increase the amplitude of the waveform. For example, in the case where the physical output signal is a pulse signal, the amplitude of the waveform of the signal may be adjust by modulating the pulse signal with PWM (Pulse Width Modulation) including adjusting the width and duty ratio of the pulse signal. In the case where the physical output signal is a sinusoidal signal or a triangular wave or a pulse signal, a relevant adjustment circuit may be used to adjust the slopes of the rising edge and falling edge of the waveform.

The preset threshold may be determined according to parameters of the network switching chip in the network switching module.

Specifically, the network switching module 11 negotiates a network link of 10 Mbps and the full duplex mode between the network switching module 11 and the user equipment, for transmitting data stably along a long-distance. A negotiation may be as follows. The network port of the switch is in a self-negotiation mode, and the data transmission rate is 10 Mbps. The user equipment is in a 10 Mbps self-negotiation mode, 10/100 Mbps self-negotiation mode or 10/100/1000 Mbps self-negotiation mode. The negotiated outcome for the link may be the 10 Mbps full duplex mode after the network switching module 11 interacts with the user equipment.

Further, as shown in FIG. 1, the Ethernet switch further includes a power module 14, a display module 15, a clock module 16, a reset module 17, a transformer module 18, and a network interface module 19. The power module 14, the display module 15, the clock module 16, the reset module 17 and the transformer module 18 are respectively connected to the network switching module 11. The network interface module 19 is connected to the transformer module 18.

The power module 14 is configured for supplying power to the network switching module 11, which converts external input power into internal operating power to ensure a reliable operation of the device.

The display module 15 is configured for providing an indication for an operating status of the network switching module 11, including providing a power indication and a network operating status indication, so as to facilitate a client to understand the operating status of the device.

The clock module 16 is configured for providing a system operating clock for the network switching module 11.

Specifically, the clock module may be implemented as a passive crystal that inputs a 25 MHz clock signal to the network switching module to provide the system operating clock for the network switching module.

The reset module 17 is configured for providing a system reset signal for the network switching module 11, which is low active in power on.

The transformer module 18 is configured for providing an Ethernet physical-link layer signal isolation function for the network switching module 11.

The network interface module 19 is configured for providing an interface for a network device to access the network switching module 11.

Optionally, the display module 15 may be, but not limited to, an LED display panel; and the network interface module 19 may be, but not limited to, an RJ45 interface.

Figure 2:
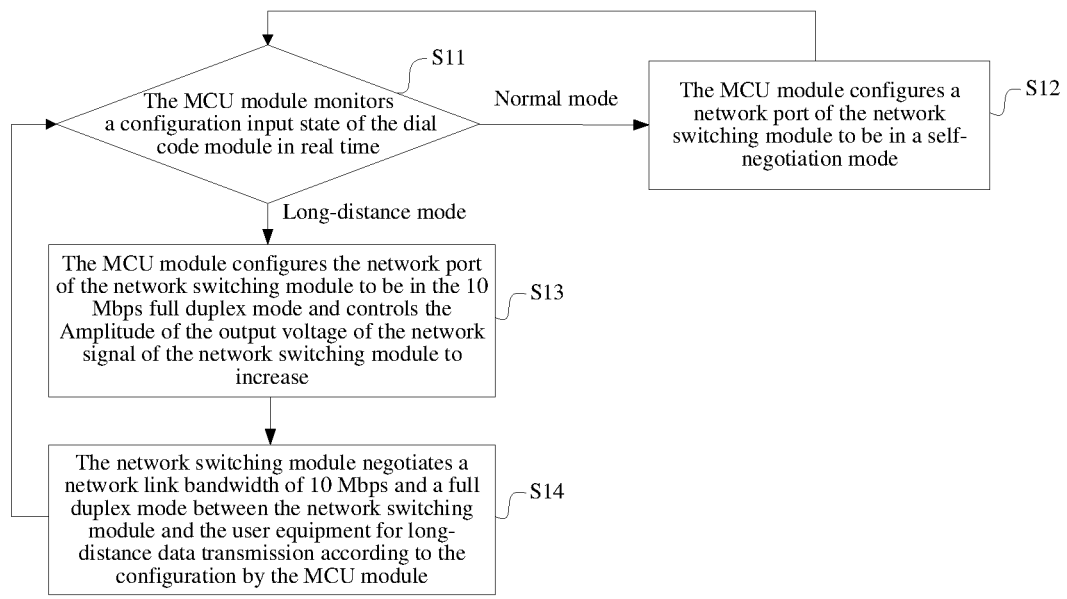
FIG. 2 is a flowchart of a long-distance transmission method for an Ethernet switch according to an embodiment of the present application.

An embodiment of the present application further provides a long-distance transmission method for an Ethernet switch including a network switching module, an MCU module and, a dial code module. The MCU module is connected to the network switching module, and the dial code module is connected to the MCU module. As shown in FIG. 2, the method includes steps S11-S14.

At step S11, after the Ethernet switch is powered on, the MCU module monitors the configuration input state of the dial code module in real time.

At step S12, when the dial code module is detected being in the configuration input state for the normal mode, the MCU module configures a network port of the network switching module to be in a self-negotiation mode (i.e. the adaptive mode shown in the figure), and the method returns back to step S11.

At step S13, when the dial code module is detected being in the configuration input state for the long-distance mode, the MCU module configures the network port of the network switching module to be in a 10 Mbps full duplex mode and controls the amplitude of the output voltage of the network signal of the network switching module to increase.

At step S14, the network switching module negotiates a network link bandwidth of 10 Mbps and a full duplex mode between the network switching module and the user equipment for long-distance data transmission according to the configuration made by the MCU module, and the method returns back to step S11.

In the embodiment of the long-distance transmission method for an Ethernet switch provided herein, when the MCU module detects that the dial code module is the configuration input state for the long-distance mode, the MCU module configures the network port of the network switching module to be in the 10 Mbps full duplex mode and controls the amplitude of the output voltage of the network signal of the network switching module to increase. The network switching module negotiates the network link bandwidth of 10 Mbps and full duplex mode between the network switching module and the user equipment for long-distance data transmission according to the configuration by the MCU module. Compared to the prior art, the embodiment of the present application achieves a long-distance data transmission over Ethernet by using a 10 Mbps network and increasing the amplitude of the output voltage of the network signal, and the transmission distance of data over Ethernet can be extended without a dedicated long-distance network chip. A user can extend the distance for network accesses without making any change in the existing network wiring and front-end network devices, which protects the original investment of the user. In the construction of networks, such a switch may be added or may replace an old conventional Ethernet switch, so as to achieve an economical solution for the problem that the network may be inaccessible or there may be a data loss due to the wiring distance between a device and the switch over 100 m or a non-standard cable with poor quality.

Specifically, the network switching module includes a network port speed control register. The MCU module configures the network port of the network switching module to be in the 10 Mbps full duplex mode by setting the network port speed control register of the network switching module to the 10 Mbps full duplex mode.

Specifically, the network switching module includes a network port physical output signal control register. The MCU module controls the amplitude of the output voltage of the network signal to increase by configuring the network port physical output signal control register of the network switching module to adjust the slopes of a rising edge and a falling edge of a waveform of the physical output signal of the network port of the network switching module to a preset threshold and increase the amplitude of the waveform of the physical output signal to a preset voltage value, for example, increasing from 1.8 V to 2.2 V.

Specifically, after the MCU module configures the network port of the network switching module to be in the 10 Mbps full duplex mode, the network switching module negotiates the network link bandwidth of 10 Mbps and the full duplex mode between the network switching module 11 and the user equipment, for transmitting data stably along a long-distance. A negotiation may be as follows. The network port of the switch is in a self-negotiation mode, and the data transmission rate is 10 Mbps. The user equipment is in a 10 Mbps self-negotiate mode, 10/100 Mbps self-negotiation mode, or 10/100/1000 Mbps self-negotiation mode. The negotiated outcome for the link may be the 10 Mbps full duplex mode after the network switching module interacts with the user equipment.

Further, the Ethernet switch further includes a power module, a display module, a clock module, a reset module, a transformer module, and a network interface module. The power module, the display module, the clock module, the reset module and the transformer module are connected to the network switching module respectively. The network interface module is connected to the transformer module. The method further includes:

supplying, by the power module, power to the network switching module, which converts external input power into internal operating power;

providing, by the display module, an indication of an operating status of the network switching module;

providing, by the clock module, a system operating clock for the network switching module;

providing, by the reset module, a system reset signal for the network switching module; providing, by the transformer module, an Ethernet physical-link layer signal isolation function for the network switching module; and providing, by the network interface module, an interface for a network device to access the network switching module.

Optionally, the display module is an LED display panel, and the network interface module 19 is an RJ45 interface.

It should be noted that the relationship terms herein such as "first", "second", and the like are only used for distinguishing one entity or operation from another entity or operation, but do not necessarily require or imply that there is any actual relationship or order between these entities or operations. Moreover, the wording "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles or devices. Without further limitations, elements defined by the wording "comprise(s) a" or "include(s) a" do not exclude that the processes, methods, articles or devices including these elements also includes other identical elements.

All the embodiments above are described in a related manner Same or similar parts in each of the embodiments can be referred to one another. The parts emphasized vary from embodiment to embodiment.

Particularly, the embodiments of the method are described briefly since they are similar to the embodiments of the device. For similar parts, one could refer to the corresponding description for the embodiments of the device.

The logics and/or steps represented in the flowchart or otherwise described herein, for example, may be considered as a sequence of executable instructions for implementing logical functions, and may be implemented in any computer readable medium for the use by an instruction execution system, apparatus, or device (e.g., a computer-based system, a system including a processor, or other system that may take instructions from an instruction execution system, apparatus or device and execute them), or may be used in conjunction with these instruction execution system, apparatus or device. Here, the "computer readable medium" can be any apparatus that may contain, store, communicate, propagate, or transmit a program which is used by an instruction execution system, apparatus or device, or used in conjunction with such an instruction execution system, apparatus or device. More specific examples (non-exhaustive list) of the computer readable medium include: an electrical connection (electronic device) having one or more wires, a portable computer disk cartridge (magnetic apparatus), a random access memory (RAM), a read only memory (ROM), an erasable editable read only memory (EPROM or flash memory), a fiber optic device, and a portable compact disk read only memory (CDROM). In addition, the computer readable medium may even be a paper or other suitable medium on which the program may be printed, since the paper or other medium may be optically scanned, followed by editing, interpretation or, if necessary, other suitable processing to obtain the electronic version of the program, and then the obtained program is stored in a computer memory.

It should be understood that each part described in the present application may be implemented as hardware, software, firmware or a combination thereof.

In the above described implementations, multiple steps or methods may be implemented as software or firmware stored in a memory and executed by a suitable instruction execution system. For example, in case of hardware, as in the other implementation, they may be implemented by any one or combination of the following technologies well known in the art: a discrete logic circuit having a logic gate circuit for implementing logic functions on data signals, a dedicated integrated circuit having a suitable combinatorial logic gate circuit, programmable gate arrays (PGA), field programmable gate arrays (FPGA), or the like.

It will be understood by those of ordinary skills in the art that all or some of the steps in the methods described above may be implemented by a program instructing the associated hardware. The program may be stored in a computer readable storage medium, and when executed, carries out one or combination of the steps of the method embodiments.

For ease of description, the devices are described in the way that it is divided into various units/modules. Of course, the functions of units/modules may be implemented in the same or in different software and/or hardware when implementing the present application.

It will be apparent to those skilled in the art from the above description of the implementation, the present application may be implemented by means of software in connection with a necessary general hardware platform. Based on such understanding, the essential parts of the technical solution of the present application or the parts contributing to prior art may be embodied in the form of a software product. The computer software product may be stored in a storage medium such as a ROM/RAM, a disk, an optical disk, etc., and includes several instructions for causing a computer device (which may be a personal computer, a server, or a network device, etc.) to perform the methods of various embodiments or portions of the embodiments described herein.

The invention claimed is:

1. An Ethernet switch, comprising a network switching module, a microcontroller unit (MCU), and a dial code module; the MCU being connected to the network switching module, and the dial code module being connected to the MCU; wherein the dial code module using a processor configured to provide for two configuration inputs for a normal mode and a long-distance mode for user equipment; the MCU is configured for monitoring a configuration input state of the dial code module in real time, wherein when detecting that the dial code module is in the configuration input for the normal mode, the MCU configures a network port of the network switching module to be in a self-negotiation mode; and when detecting that the dial code module is in the configuration input state for the long-distance mode, the MCU configures the network port of the network switching module to be in a 10 Mbps full-duplex mode and controls an amplitude of an output voltage of a network signal of the network switching module to increase; and the network switching module is configured for negotiating a network link bandwidth of 10 Mbps and a full duplex mode between the network switching module and the user equipment for long-distance data transmission according to a configuration made by the MCU when the dial code module is in the long-distance mode, wherein the MCU is further configured for determining a maximum value for the amplitude of the output voltage according to parameters of a network switching chip in the network switching module, and increasing the amplitude of the output voltage based on the determined maximum value for achieving the long-distance data transmission.

2. The Ethernet switch of claim 1, wherein the network switching module comprises a network port speed control register; and wherein the MCU is configured for setting the network port speed control register of the network switching module to the 10 Mbps full duplex mode when detecting that the dial code module is in the configuration input state for the long-distance mode.

3. The Ethernet switch of claim 1, wherein the network switching module comprises a network port physical output signal control register, and wherein the MCU is configured for, detecting that the dial code module is in the configuration input state for the long-distance mode, configuring the network port physical output signal control register of the network switching module to adjust slopes of a rising edge and a falling edge of a waveform of a physical output signal of the network port of the network switching module to a preset threshold and increase an amplitude of the waveform of the physical output signal to a preset voltage value.

4. The Ethernet switch of claim 3, wherein the Ethernet switch further comprises a power supply, a display module, a clock module, a reset module, a transformer, and a network interface; wherein the power supply, the display module, the clock module, the reset module and the transformer are connected to the network switching module respectively, and the network interface is connected to the transformer; and wherein the power supply is configured for supplying power to the network switching module, which converts external input power into internal operating power; the display module is configured for providing an indication for an operating status of the network switching module; the clock module is configured for providing a system operating clock for the network switching module; the reset module having a processor configured for providing a system reset signal for the network switching module; the transformer is configured for providing an Ethernet physical-link layer signal isolation function for the network switching module; and the network interface is configured for providing an n interface for a network device to access the network switching module.

5. The Ethernet switch of claim 4, wherein the display module is an LED display panel, and the network interface is an RJ45 interface.

6. A long-distance transmission method for an Ethernet switch, wherein the Ethernet switch comprises a network switching module, an MCU, and a dial code module, the method comprising: after the Ethernet switch is powered on, monitoring, by the MCU, the configuration input state of the dial code module in real time, wherein the dial code module comprises a processor configured to provide for two configuration inputs for a normal mode and a long-distance mode for user equipment; when the dial code module is detected being in the configuration input state for a normal mode, configuring, by the MCU, a network port of the network switching module to be in a self-negotiation mode; and when the dial code module is detected being in the configuration input state for a long-distance mode, configuring, by the MCU, the network port of the network switching module to be in a 10 Mbps full duplex mode and controlling an amplitude of an output voltage of the network signal of the network switching module to increase; and negotiating, by the network switching module, a network link bandwidth of 10 Mbps and a full duplex mode between the network switching module and the user equipment for long-distance data transmission according to the configuration made by the MCU, wherein controlling the amplitude of the output voltage of the network signal of the network switching module to increase includes: determining, by the MCU, a maximum value for the amplitude of the output voltage according to parameters of a network switching chip in the network switching module, and increasing the amplitude of the output voltage based on the determined maximum value for achieving the long-distance data transmission.

7. The long-distance transmission method for an Ethernet switch of claim 6, wherein the network switching module comprises a network port speed control register, and wherein configuring, by the MCU, the network port of the network switching module to be in a 10 Mbps full duplex mode comprising: setting, by the MCU, the network port speed control register of the network switching module to the 10 Mbps full duplex mode.

8. The long-distance transmission method for an Ethernet switch of claim 6, wherein the network switching module comprises a network port physical output signal control register, and wherein controlling, by the MCU, an amplitude of an output voltage of a network signal comprising: configuring, by the MCU, the network port physical output signal control register of the network switching module to adjust slopes of a rising edge and a falling edge of a waveform of the a physical output signal of the network port of the network switching module to a preset threshold and increase an amplitude of a waveform of the physical output signal to a preset voltage value.

9. The long-distance transmission method for an Ethernet switch of claim 8, wherein the Ethernet switch further comprises a power supply, a display module, a clock module, a reset module, a transformer, and a network interface; the method further comprising: supplying, by the power supply, power to the network switching module, which converts external input power into internal operating power; providing, by the display module, an indication of an operating status of the network switching module;

providing, by the clock module, a system operating clock for the network switching module; providing, by the reset module, a system reset signal for the network switching module, wherein the reset module comprises a processor configured for providing a system reset signal for the network switching module; providing, by the transformer, an Ethernet physical-link layer signal isolation function for the network switching module; and providing, by the network interface, an interface for a network device to access the network switching module.

10. The long-distance transmission method for an Ethernet switch of claim 9, wherein the display module is an LED display panel, and the network interface is an RJ45 interface.

* * * * *